(No Model.) 2 Sheets—Sheet 2.
E. REICHENBACH.
LEVELING INSTRUMENT FOR GRADING DITCHES.
No. 360,247. Patented Mar. 29, 1887.
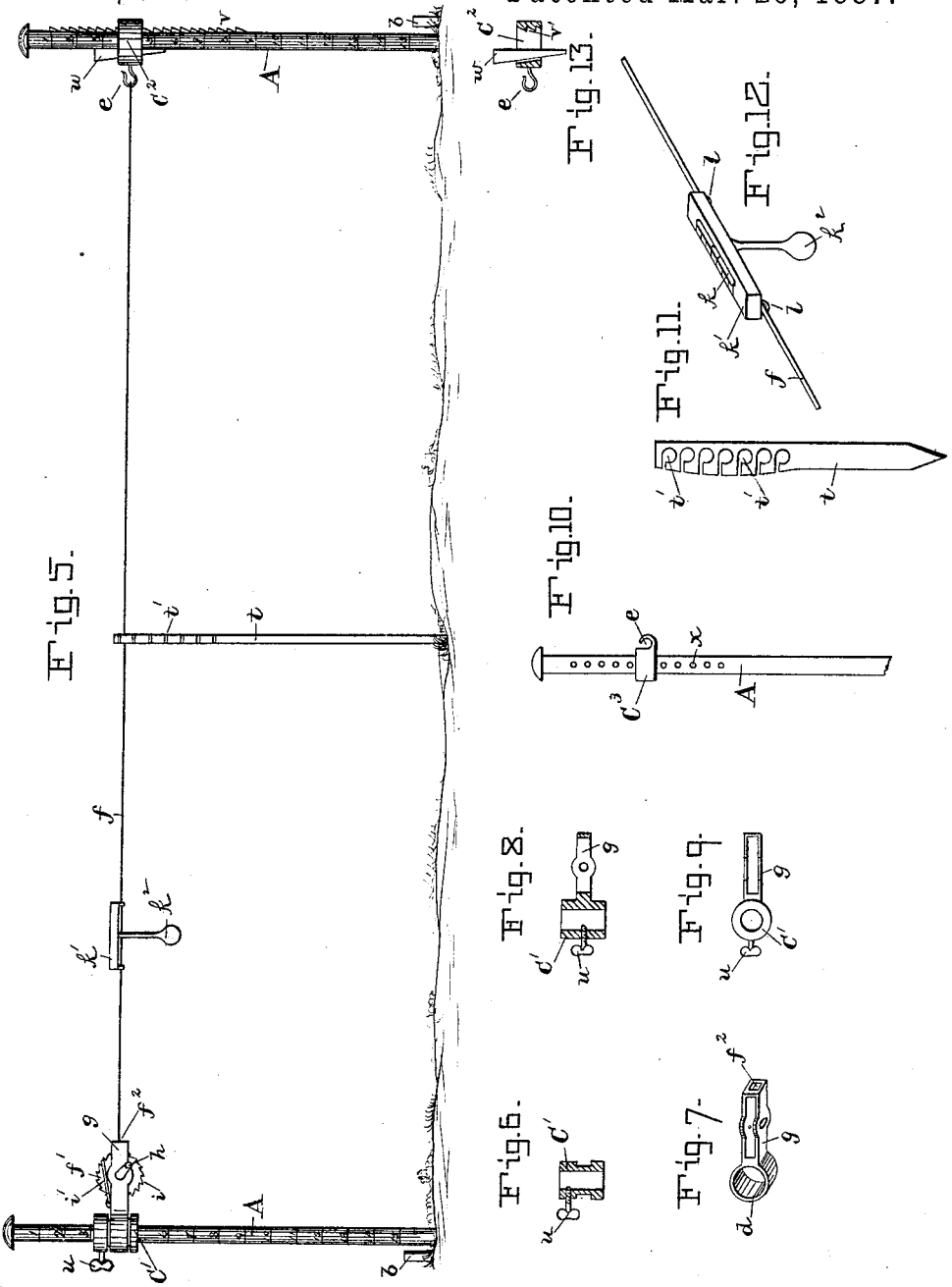
WITNESSES:
A. E. Eader
John E. Morris.
INVENTOR:
Edw. Reichenbach
BY Chas B. Mann
ATTORNEY.
N. PETERS. Photo-Lithographer, Washington, D. C.

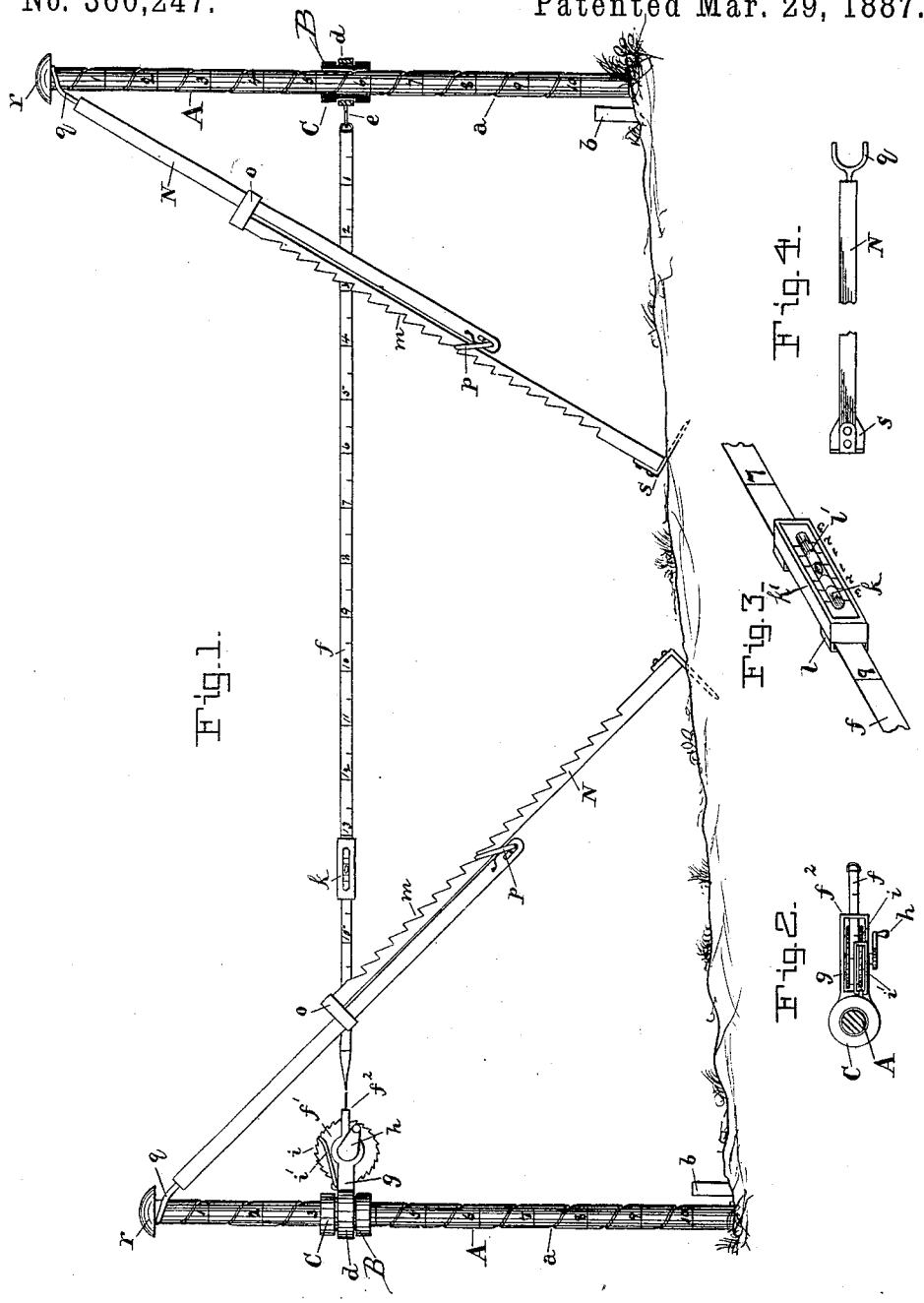

UNITED STATES PATENT OFFICE.

EDWARD REICHENBACH, OF ORRVILLE, OHIO.

LEVELING-INSTRUMENT FOR GRADING DITCHES.

SPECIFICATION forming part of Letters Patent No. 360,247, dated March 29, 1887.

Application filed September 25, 1886. Serial No. 214,570. (No model.)

*To all whom it may concern:*

Be it known that I, EDWARD REICHENBACH, a citizen of the United States, residing at Orrville, in the county of Wayne and State of Ohio, have invented certain new and useful Improvements in Devices for Use in Grading Ditches, of which the following is a specification.

This invention relates to a new and useful device to be employed in laying off and grading ditches, and is illustrated in the accompanying drawings, in which—

Figure 1 is an elevation of the device illustrating one form of construction, and shows the manner of using it. Fig. 2 is a top view of the tape-reel bracket. Fig. 3 is a view of the spirit-level and tape-line. Fig. 4 is a detail view of one of the props or braces. Fig. 5 is an elevation of the device, illustrating certain modifications in the construction. Figs. 6 and 7 are detail views of one form of tape-line holder. Figs. 8 and 9 are detail views of another form of tape-line holder. Fig. 10 is a view showing another modification in the construction of the upright shaft. Fig. 11 is a side view of the stake for supporting the tape-line. Fig. 12 is a detail view showing a modification in the construction of the spirit-level and its attachment to the tape-line or measure-cord. Fig. 13 is a section view of one form of tape-line holder.

Assuming that the line of the ditch has been surveyed and staked off, each of the two upright shafts A are set or driven in the ground several inches deep, or sufficient to sustain them. They are each placed near a surveyor's stake, $b$, and may be several rods apart. A tape-line holder, B, consisting of a nut and collar with hook, is attached to each upright shaft A in such manner as to be movable up and down thereon. In the drawings several different forms of construction are shown, whereby the movement of this part may be effected. In Fig. 1 each upright shaft has a screw-thread, $a$, on it, and a nut, C, which fits the screw-thread. Upon being turned the nut will ascend or descend the shaft. The upright shafts also have a set of numbers commencing at the top with 1 2 and progressing downward. These numbers indicate the height in inches which the shaft projects above the ground. A collar, $d$, loosely surrounds each nut C, so as to permit the nut to be turned without turning the collar. The collar on one nut has a hook, $e$, with which the loop or ring at the end of a tape-line, $f$, engages. The collar $d$ on the other nut has a frame or bracket, $g$, which holds the tape-line spool $f'$, while a crank, $h$, is employed to wind up the tape-line. In the front end of the bracket $g$ is a slotted guide, $f^2$, (the slot is seen in Fig. 7,) on the same horizontal plane as the collar, and through which the tape-line $f$ passes, and which serves to prevent the tape-line while being wound on the spool from becoming twisted. The slotted guide $f^2$ also maintains the stretched tape-line $f$ at the same constant height, so that the height of the stretched line is not affected by the condition of the spool—that is, whether it be wound nearly full of the tape-line or so far unwound as to be nearly empty. The spool $f'$ has a ratchet-wheel, $i$, and a pawl, $i'$, engages with the ratchet-wheel and serves to hold the spool from unwinding when the tape-line is stretched taut. The tape-line spool may be dispensed with, and the collar $d$ on both nuts may have a hook, $e$, to hold the tape-line.

The tape-line is provided with a spirit-level, $k$. The glass tube of the level is secured to a block, $k'$, which has two staples or keepers, $l$, through which the tape-line passes. The staples secure the spirit-level block to the tape-line and enable it to be shifted or moved to any point along the said line. The glass tube of the spirit-level is provided with cross gage-marks $l'$, and two sets of numbers, as 1 2 3, (see Fig. 3,) are fixed on the block, one number adjacent to each mark. The numbers commence at the center with 1, and from thence extend both ways. Each cross-mark is to designate the position of the air-bead in the glass tube, and this position indicates the deviation of the tape-line from a level.

It is immaterial whether a tape-line or a measure-cord be used. Both are here shown. Figs. 1 and 3 show a tape-line, and Figs. 5 and 12 show a cord. The spirit-level block $k'$ may have a weight, $k^2$, of any suitable kind, attached to its lower side for the purpose of balancing the block on the line or cord, and thereby maintain the spirit-glass uppermost.

Adjustable props or braces N are employed to sustain the two upright shafts A. These props N consist of two bars which slide lengthwise upon each other and are thereby extensible. One bar is racked, or provided with teeth m, and has at one end a band, o, which loosely encircles the other bar, and this latter bar has at one end a spring-loop, p, which encircles the racked bar and engages with the teeth. When the loop p is not engaged with one of the teeth m, the effect of its spring construction is such that it will stand at a right angle with respect to the bar, and thereby the racked bar may slide freely.

The upper end of the prop N has a crotch or concave prongs, q, which take position against the shaft A, below its head r. The lower end has a broad foot, s, shaped like a hoe, or having other suitable shape, to prevent it from pushing too deep in soft ground and to give the brace a proper foundation. The particular arrangement or manner here shown of propping the upright shafts A is not essential. They may be otherwise stayed or braced, and in Fig. 5 no braces at all are shown.

A stake, t, provided with notches t', (see Figs. 5 and 11,) to support the tape-line or cord, is employed when the distance between the two uprights A is so great as to cause the tape or cord to sag materially, or this stake is useful in case of wind effecting the line. This stake should be driven in the ground about midway between the two upright shafts.

The relative position of the various parts when first set up is shown in Figs. 1 and 5.

The device may be used on ground having either a level or an undulating surface.

As already stated, the tape-line holders B (shown in Fig. 1) are moved either up or down on the upright shaft A by means of the screw-thread a and the nut C. In Fig. 5 this up-and-down movement is effected by a modified construction. The upright shaft A at the left of Fig. 5 is plain or smooth, and has a collar, C', provided with a set-screw, u. The collar will slide up or down on the shaft freely; but the set-screw u will retain it at any desired point of elevation. The collar C' carries the tape-line holder, and may have a separate collar, d, (see Fig. 7,) provided with a frame or bracket, g, which is like the construction shown in Fig. 1; or it may have a frame or bracket, g, directly attached to it, as shown in Figs. 8 and 9. Another construction to effect the up-and-down movement of the tape-line holder is shown at the right-hand end of Fig. 5. Here the upright shaft has teeth or notches v, and the collar C², which carries the tape-line holder, surrounds the shaft and has internal serrations, v', to engage with said teeth. A wedge, w, is employed, as shown in Figs. 5 and 13, to retain the collar C² at any desired point of elevation. Still another construction to effect this same movement is shown in Fig. 10. Here the upright shaft A has holes x, and the collar C³, which carries the tape-line holder, moves freely on the shaft and is retained at any desired point of elevation by a pin inserted below said collar in one of the holes x.

The screw-shaft A (shown in Fig. 1) must be round; but the shafts A (shown in the other figures) may be round or square. In either case these shafts may be hollow, like a tube, or solid. When made of metal, they are lighter if constructed hollow or tubular.

The manner of using the device is as follows: One of the shafts A is vertically set up, as shown in Fig. 1, alongside of one of the stakes b, the prop N being used to support or brace the said shaft. By means of the rack m and spring-loop p the prop is readily adjusted, so as to conveniently adapt its length to the vertical position of the shaft. The holder B on this shaft is raised to a convenient distance, which is noted by the figures on the shaft, so that the height of the tape-line is known. The other shaft A is then vertically set up in the line of ditching and braced by its prop N, similar to that of the other shaft. The holder B on this shaft is raised or lowered, as the case may be, until the tape-line f is level, as indicated by the spirit-level k, which may be run freely along the said tape-line for that purpose. The distance of the foot of the last shaft A below the holder will determine the level of that place. A second stake, b, may here be driven and the level of its head readily ascertained.

Having described my invention, I claim and desire to secure by Letters Patent of the United States—

1. In a device for use in grading ditches, the shafts A, with screw-threads thereon, in combination with the holders B, the bracket g, the tape-line f, and the reel f', journaled in said bracket, whereby the tape-line may be adjusted in length, substantially as and for the purpose set forth.

2. In a leveling device, the shaft A, with screw-thread thereon, in combination with nut C', fitted to said screw-thread, the collar d, having hook e, and the adjustable tape-line f, all substantially as shown and described.

3. In a device for use in grading ditches, consisting of two shafts, with a tape-line having a spirit-level freely movable thereon, holders vertically movable on said shafts, means for adjusting the length of said tape-line, and adjustable braces for said shafts, all combined and operating substantially as shown and described.

4. In a ditch-grading device, the combination of an upright shaft, a tape-line holder movable up or down on the said shaft, means, substantially as described, to retain the said holder at any desired point of elevation, a tape-line attached to the said holder, and an extensible brace, N, for propping the upright shaft, having a hoe-shaped foot, as set forth.

In testimony whereof I affix my signature in the presence of two witnesses.

EDWARD REICHENBACH.

Witnesses:
ISAAC PONTIUS,
ADAM WIRTH.